Oct. 2, 1951  P. J. SCHOENSTER ET AL  2,569,582
KNITTING MACHINE
Filed Jan. 14, 1949  9 Sheets-Sheet 1

WITNESSES
Hubert Fuchs
Thomas W. Kerr Jr

INVENTORS:
Peter J. Schoenster &
Max E. Ebert,
BY Paul & Paul
ATTORNEYS.

Oct. 2, 1951     P. J. SCHOENSTER ET AL     2,569,582
KNITTING MACHINE
Filed Jan. 14, 1949     9 Sheets-Sheet 3

WITNESSES
Hubert Fuchs
Thomas W. Kerr Jr

INVENTORS:
Peter J. Schoenster &
Max E. Ebert,
BY Paul & Paul
ATTORNEYS.

Patented Oct. 2, 1951

2,569,582

UNITED STATES PATENT OFFICE 2,569,582

KNITTING MACHINE

Peter J. Schoenster, Teaneck, and Max Emil Ebert, West New York, N. J., assignors to Alfred Hofmann & Co., West New York, N. J., a corporation of New Jersey Application January 14, 1949, Serial No. 70,928

16 Claims. (Cl. 66—89)

This invention relates to knitting machines. More specifically it has reference to straight knitting machines of the "Cotton" type modified after the manner described in U. S. Patent #2,430,882 granted to J. P. Ludwig on November 18, 1947, for the production, in one operation, of full fashioned stocking blanks complete with foot portions characterized by having inset or gusset heel cheeks.

In the knitting machine of the Ludwig patent, sets of auxiliary presser elements are associated with the spring beard needles of two end groups which are employed in the formation of the heel cheeks of the stocking blanks. The presser elements of each set are selected in changing numbers of co-action with corresponding needles of the aforesaid end groups to cause them to knit successive courses of the heel cheek gussets while the intervening needles are idled. Such selection of the presser elements of the two sets is effected by separate selector slides which are progressively shifted toward each other for a definite time interval, and later progressively shifted away from each other for another definite time interval, as required to properly fashion the heel cheeks.

The chief aim of our invention is to provide improved mechanism for controlling an operating the auxiliary presser elements in the heel knitting, which is simpler in construction than that of the Ludwig patent, and which, moreover, lends itself to incorporation in standard existent straight stocking knitting machines at very much less expense.

Other objects and attendant advantages will appear from the following detailed description of the attached drawings, wherein.

Figures 1, 14:
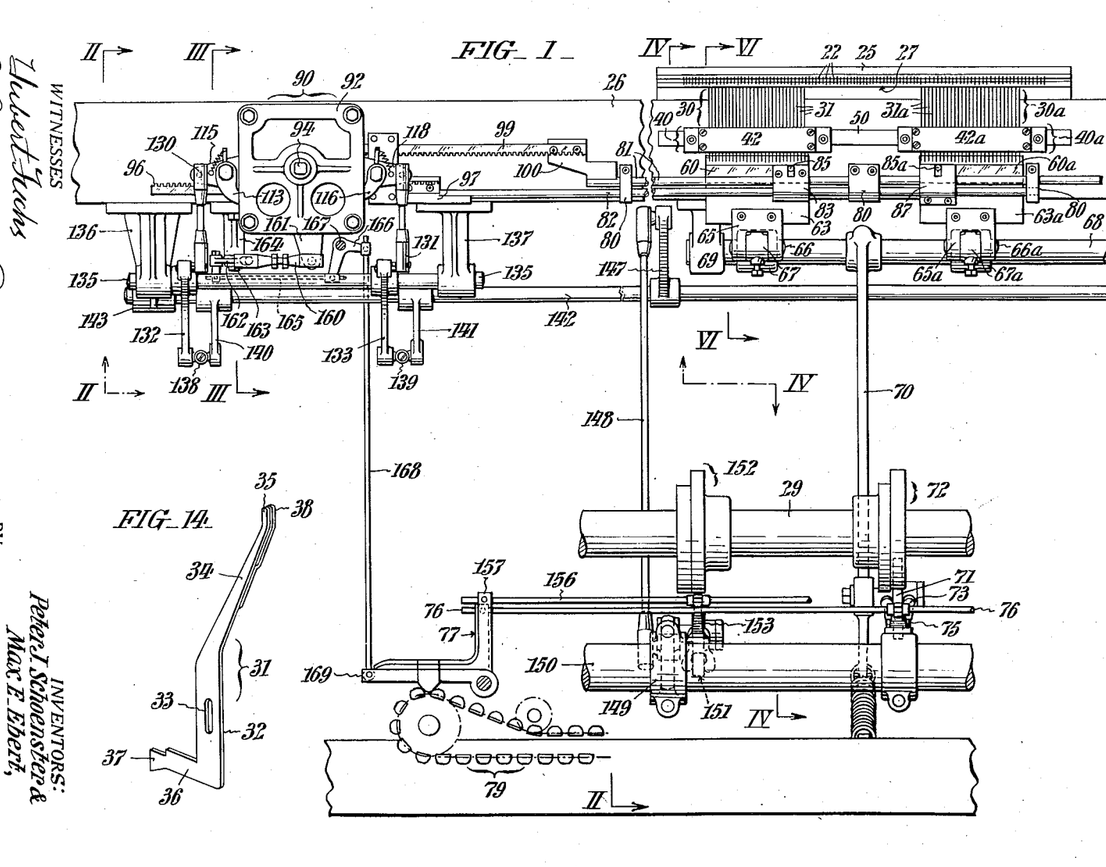
Fig. 1 is a more or less diagrammatic view in front elevation, of a straight stocking knitting machine embodying our invention.
Figs. 14-21 are perspective views of various parts which will be separately referred to hereinafter.
Figures 2, 3:
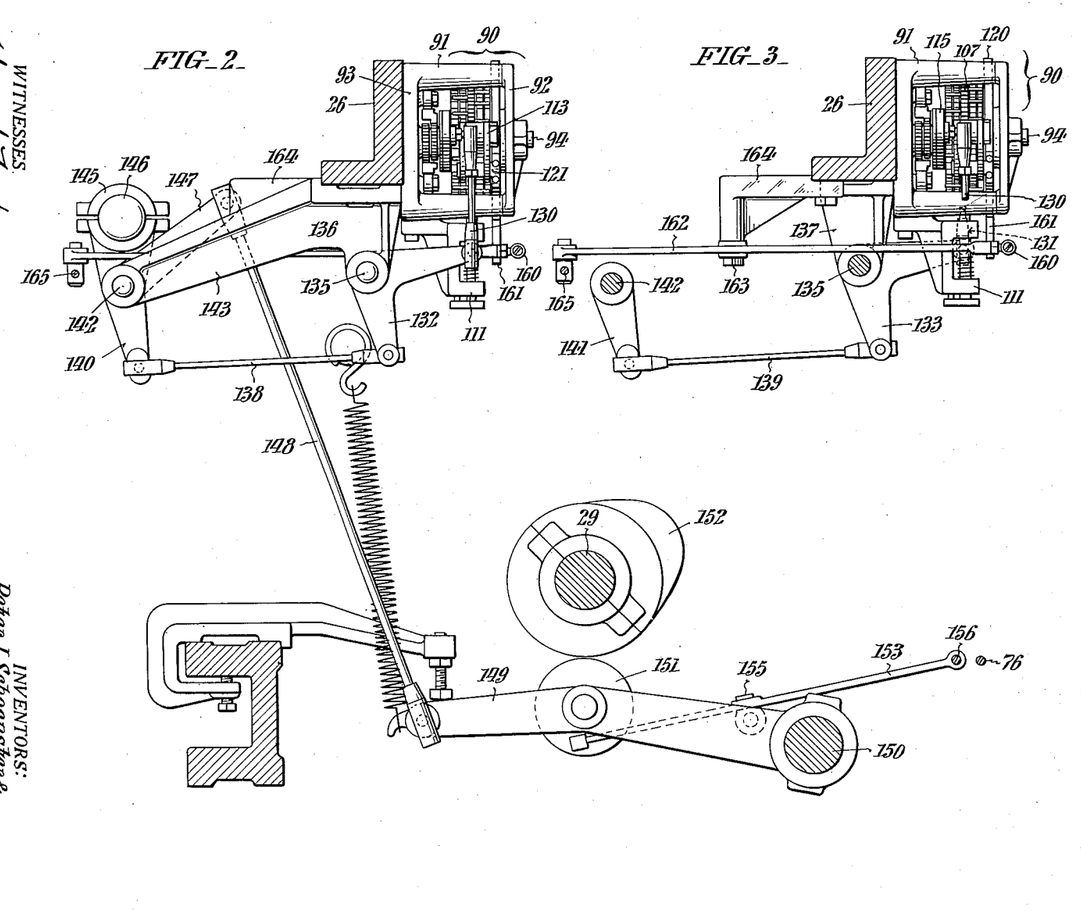
Figs. 2, 3 and 4 are transverse sectional views taken as indicated respectively by the angled arrows II—II, III—III and IV—IV in Fig. 1.
Figures 4, 15, 16, 17:
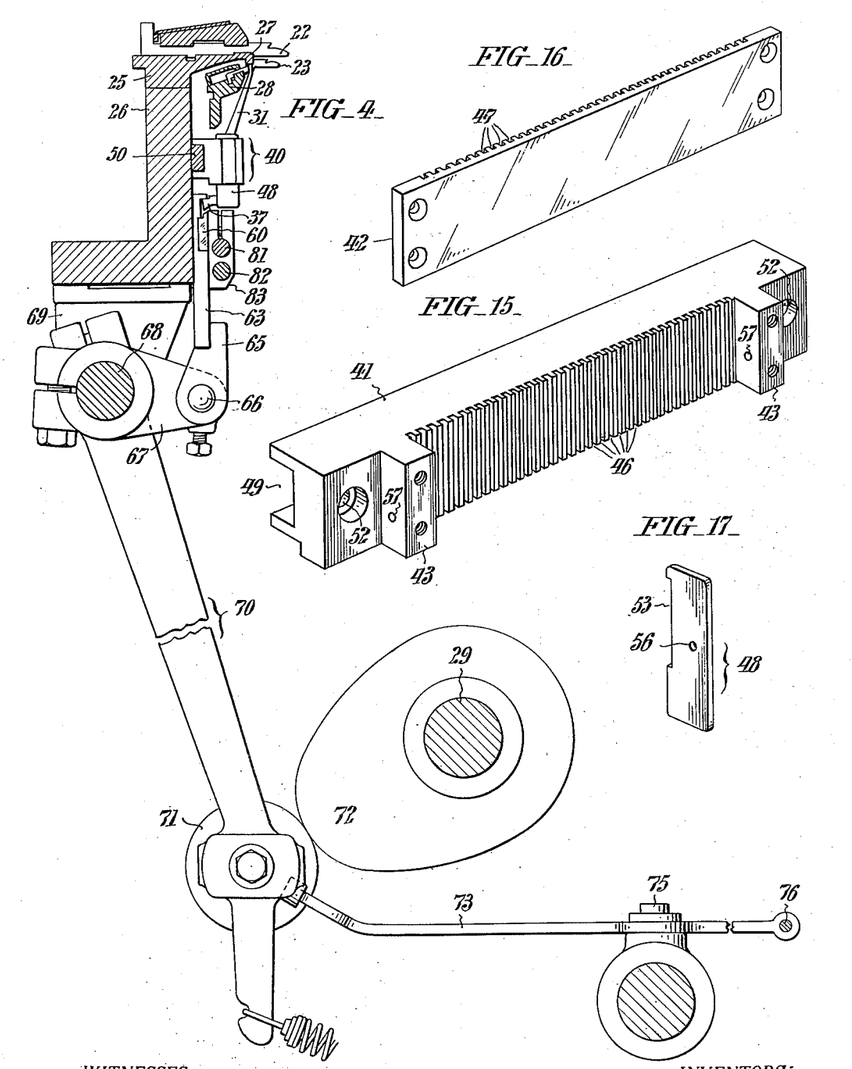

The knitting machine partly illustrated herein for convenience of exemplifying our invention, is generally of well known construction in that it has a bar 20 with a series of spring beard needles 21 (Figs. 6 and 7), and sinkers 22 and knockovers 23 to cooperate with the needles in the usual way in stitch formation. After common practice, the sinkers 22 are constrained to horizontal sliding movement relative to the needles 21 in a head 25 which is rigidly supported by the fixed central member or bed 26 of the machine framework, and which projects forwardly of said bed and provides the needle beard press edge 27. Likewise as originaly, the knockovers 23 are fixed in a longitudinal bar 28 disposed at the front of the machine beneath the forward overhanging portion of the sinker head 25. Through suitable interposed connections, not shown, the required movements are imparted in a well known way to the needle and knockover bars 20 and 28 from a longitudinally-extending cam shaft 29 (Figs. 1, 2 and 4). During the knitting of the calf, instep and toe portions of the stockings, pressing takes place as ordinarily through contact of the needle beards directly with the press edge 27. During heel formation however, the in and out movement of the needle bar is modified in a manner similar to that disclosed in the Ludwig patent to prevent contact of the beards of the instep needles with the press edge so that the knitting by the latter needles is temporarily suspended.

Figures 5, 18, 19, 20, 21:
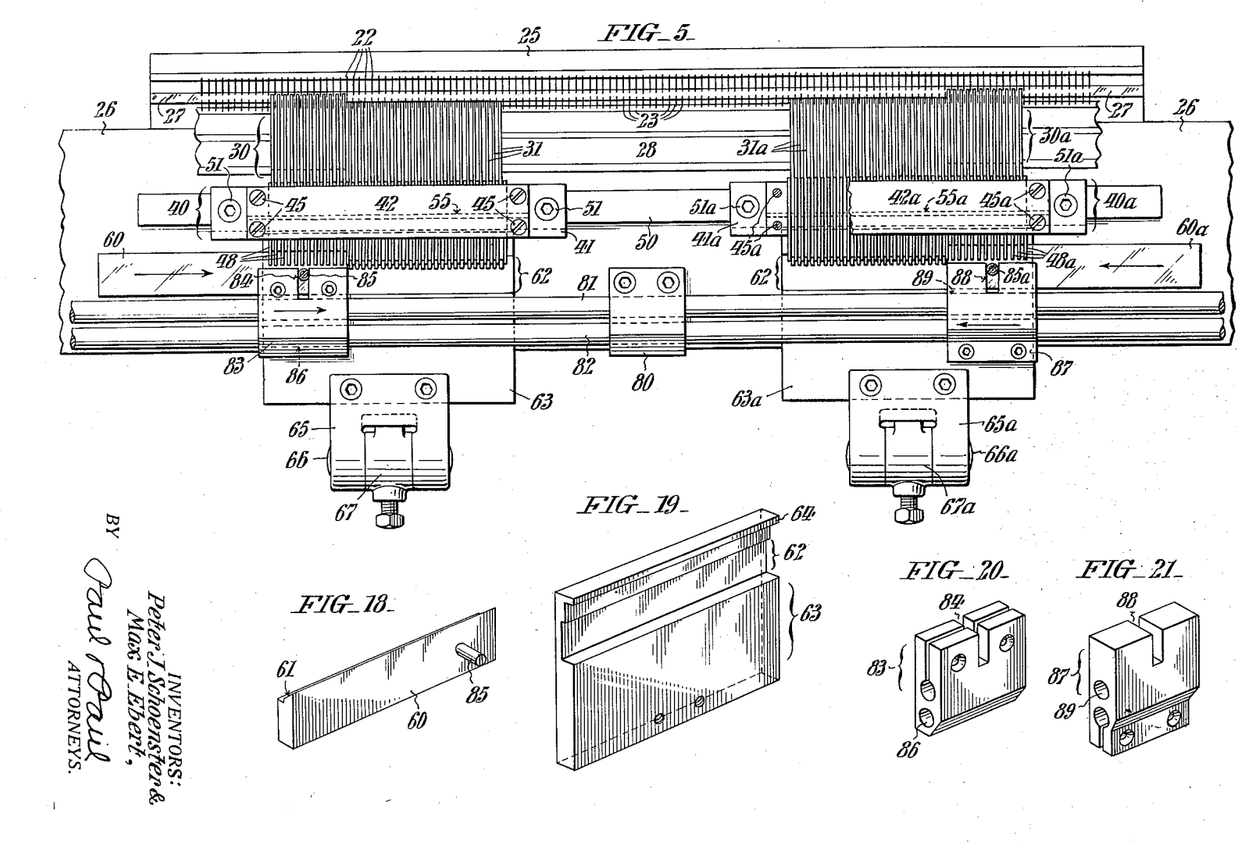
Fig. 5 is a fragmentary view in front elevation like Fig. 1 drawn to a larger scale.

Also, as in the Ludwig patent, we employ left and right sets 30 and 30a of auxiliary presser elements 31 and 31a which, during the heel knitting, are adapted to act upon the beards of individual needles of two groups adjacent opposite ends of the series on the bar 20. These auxiliary pressers, see Fig. 14, are blanked from sheet metal of a thickness corresponding approximately to that of the individual needles. In accordance with our invention, each such presser element is formed with a straight lower shank portion 32 which is longitudinally slotted as at 33; an upper shank portion 34 which is angularly offset to clear the knockover bar 28, see Figs. 6 and 7, and which terminates in a short vertical round-ended needle beard engaging tip 35; and a bottom or heel portion 36 which extends rearwardly at right angles from the lower shank portion and which terminates in a dove tail end 37. In the present instance, each auxiliary presser element 31 is moreover formed with a supplemental needle beard engaging tip 38 (see Fig. 14) for capacity to act upon two adjacent needles at a time. The presser elements 31 are vertically disposed and assembled in a box-like holder 40 consisting of a horizontally-arranged back member 41 (Fig. 15) and a cover plate 42 (Fig. 16), said back member having end portions 43 to abut the rear face of said cover plate which latter is removably secured in place by screws 45 (Fig. 5). The front face of the back member 41 and the inner face of the cover plate 42 are formed with traversely aligning vertical grooves 46 and 47 for anchorage of spacers 48 between which the auxiliary pressers 31 are slidably retained. The back member 41 is longitudinally channeled at the rear as at 49 in Figs. 6, 7 and 15, to engage over a longitudinal bar 50 affixed to the front face of the center bed 26. As shown in Fig. 5, the holder 40 is secured in position by headed screws 51 whereof the shanks pass through pre-allocated apertures 52 in opposite ends of the back member 41 and threadedly engage into the bar 50. The spacers 48 (see Fig. 17) are struck from sheet metal to generally rectangular configuration and notched as at 53 in one of their side edges so as to be held against vertical displacement in the grooves of part 41. The width of the spacers 48 is such as to determine an interval between the back and cover members 41 and 42 of the holder wherein the auxiliary presser elements 31, while being moved vertically as later on explained, can rock to a limited extent about a fulcrum rod 55 which passes through the slots 33 in said elements and through holes 56 in said spacers, and which is secured at opposite ends in apertures 57 in the portions 43 of the cover plate 41.

Figures 6, 7:
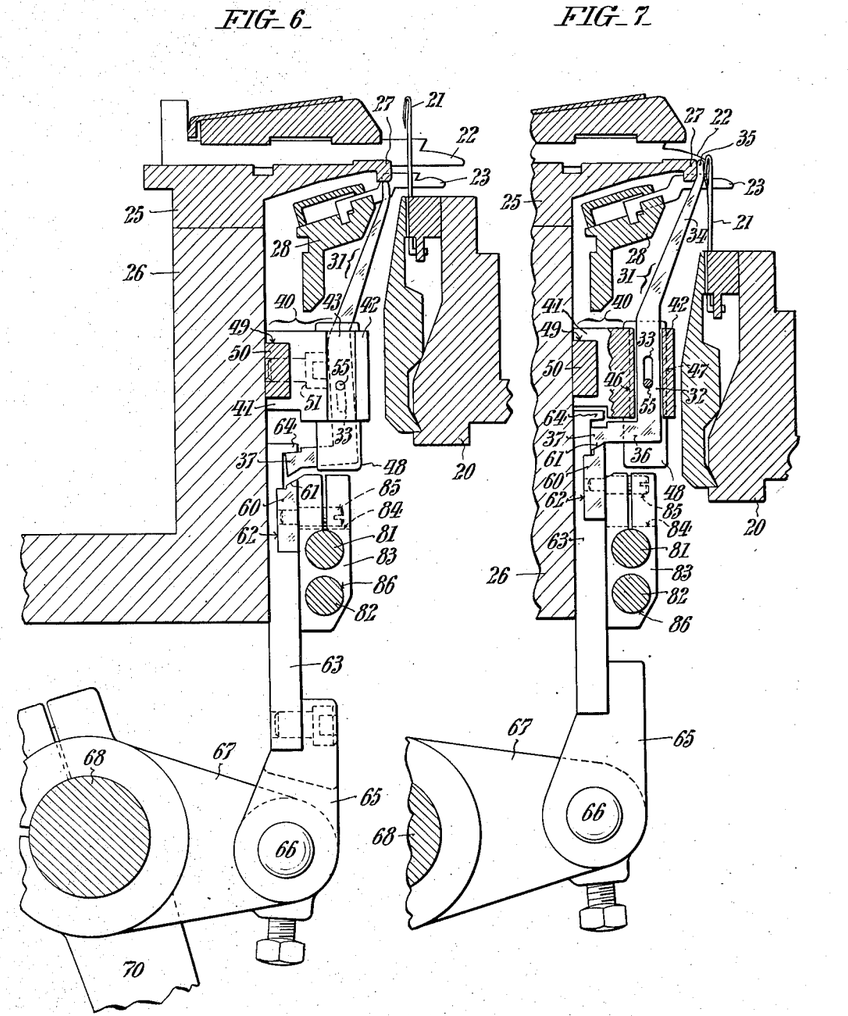
Fig. 6 is a fragmentary cross sectional view taken as indicated by the angled arrows VI—VI in Fig. 1, and likewise drawn to a larger scale.
Fig. 7 is similar to Fig. 6 with the movable parts differently positioned.

The auxiliary pressers 31 are selected for actuation by a slide bar 60, see Fig. 18, having a beveled top edge 61 for engaging the dove tail terminals 37 on the heels 36 of said pressers from beneath as in Fig. 7. The selector slide 60 is guided for endwise shifting in a horizontal groove 62 in a vertically movable catch member having the form of a plate 63, see Fig. 19, which bears against the front face of the center bed 26, and which has a flange 64 along its top edge to overreach the heels 36 of the auxiliary presser elements 31.

The holder and the selecting slide and the mounting for the right hand set of auxiliary presser elements are identical in all respects with the holder selecting slide and mounting just described for the presser elements 31 of the left hand set. Accordingly, in order to dispense with the necessity for repetitive description, all corresponding parts in the right hand assemblage of presser elements have been identified by the same reference numerals previously employed, with addition in each instance, of the letter "a" for convenience of more ready distinction.

Secured centrally to the members 63 and 63a at the bottom are clevises 65 and 65a which are pivotally connected by pins 66 and 66a to forwardly reaching arms 67, 67a on a rock shaft 68 (Figs. 1, 4, 6 and 7) which is rotatably supported in bearings 69 affixed to the center bed 26. Also clamped to the shaft 68 is a pendent arm 70 with a roller 71 adapted to be acted upon by a rotary cam 72 on the cam shaft 29 of the machine. The roller 71 is shiftable into and out of the range of cam 72 by means of a forked lever 73 which is fulcrumed intermediate its ends at 75 and connected to a link rod 76. As shown in Fig. 1, the link rod 76 extends along the front of the machine, at the bottom, to a bell crank 77 arranged to be actuated by a series of cam lugs 78 on a timing chain 79.

Movable endwise in spaced guides 80 (Figs. 1 and 5) secured to the center bed 26 are two longitudinally extending shift rods 81 and 82. To the rod 81 is clamped a block 83 (Fig. 20) which is notched at the top as at 84 to engage an outwardly projecting stud 85 on the slide 60, and which has a bore 86 for passage through it, with a free working fit, of the rod 82. In turn clamped to the rod 82 is a block 87 (Fig. 21) which is notched at the top as at 88 to engage an outwardly projecting stud 85a on the slide 60a, and which has a bore 89 for passage through it, likewise with a free working fit, of the rod 81.

Figures 12, 12A, 12B:
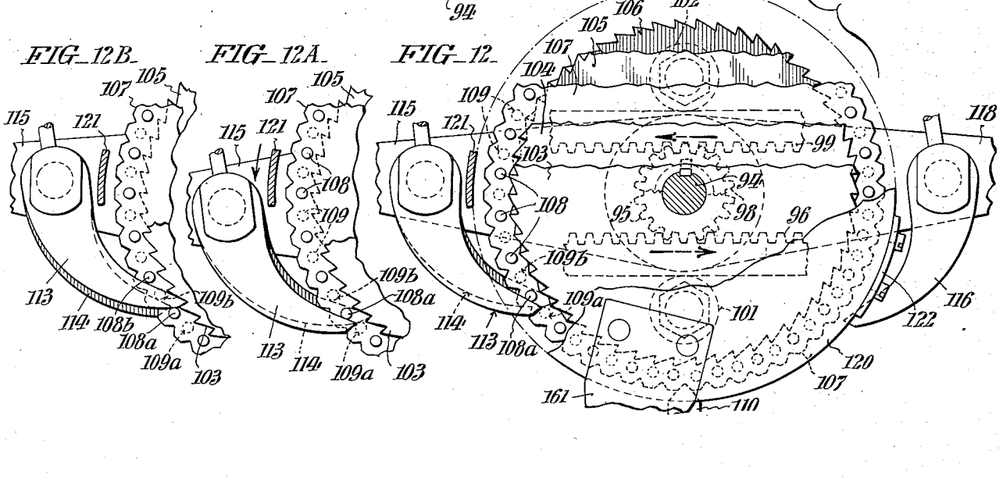
Figs. 12, 12A and 12B are fragmentary broken out views showing successive step in the operation of the indexing mechanism.

For the purpose of shifting the rods 81 and 82 (and the selector slides 60 and 60a) contrariwise and in alternation during the heel knitting, we have provided an indexing mechanism in the form of a self contained, pre-assembled unit which is comprehensively designated 90 in Figs. 1–3, 9, 10 and 11. As will be noted from these illustrations, this indexing unit 90 has an open sided housing 91 which is rigidly affixed to the center bed 26, and which has spaced front and rear wall members 92 and 93 affording bearings for the opposite ends of a transverse shaft 94. Fast on the inner end of the shaft 94 within the housing 91 is a spur pinion 95 (Figs. 10 and 11), which meshes with the teeth of an underlying horizontal bar 96 secured to the shift rod 82 by means of an adapter coupling 97. Free on the shaft 94 adjacent the pinion 95 is another spur pinion 98 that meshes with the teeth of a parallel overlying horizontal bar 99 which is in turn secured to the shift rod 81 by an adapter coupling 100 (Fig. 1). Rollers 101 and 102 serve to maintain the toothed bars 96 and 99 in engagement with the respective pinions 95 and 98. Keyed to shaft 94 within housing 91 is a pair of ratchet wheels 103 and 104 which are similar except for housing oppositely pitched teeth; and affixed in a like manner to the hub of spur pinion 98 is a pair of identical ratchet wheels 105 and 106 with oppositely pitched teeth corresponding in number with the teeth of the first mentioned ratchet wheels. Free on the shaft 94 between the two pairs of ratchet wheels is a pawl control and stop element in the form of a wheel 107 with circumferential notches likewise corresponding in number with the teeth of the individual ratchets. The pawl control and stop wheel 107 is further provided with a series of circumferentially arranged pins 108 and 109 of which alternate ones project laterally from one side of said disk over the ratchet wheels 103, 104, and of which the intermediate ones project from the other side, the total of said pins being equal to the number of notches in said wheel. A detent bolt 110 constrained to up and down movement in a pendent guide bracket 111 on the housing 91 and yieldingly urged upwardly by a spring 112, co-acts with the notches of wheel 107 to prevent accidental displacement of the latter during dwells between rotative shifts imparted thereto in a manner presently explained. Arranged to pick the ratchet wheels 103 and 105 are pawls 113 and 114 (Fig. 9) which are pivotally connected for independent movement to a supporting arm 115 free to oscillate about the shaft 94, and which are yieldingly urged toward said ratchet wheels by springs as shown. Similarly arranged to pick the ratchet wheels 104 and 106 are spring-biased pawls 116 and 117 which are pivotally connected for independent movement to another supporting arm 118, likewise capable of oscillation about the shaft 94. The indexing unit 90 further comprises a discous pawl guard element 120 which is free on the shaft 94 and interposed between the frontal member 92 of the housing 91 and the ratchet wheel 103, and whereto are secured, with provision for circumferential adjustment, segmental shields 121 and 122 which are adapted to react upon the pawls 113, 114 and 116, 117 respectively. When the disk 120 is in the position of Fig. 8, the pawls 113 and 114 are retracted from the ratchet wheels 103 and 105, while the pawls 116 and 117 are permitted to function. Movement of the disk 120 to the position of Fig. 12 results in reversal of the above condition, i. e., the pawls 116 and 117 are held retracted from the ratchet wheels 104 and 106, while the pawls 113 and 114 are permitted to function. In Fig. 12 the end of the pawl 114 is positioned in the interval between two adjacent pins 109a and 109b of the series 109 on the stop wheel 107 and engages the ratchet wheel 105, with the pawl 113 resting against an intermediate pin 108a of the series 108 and thereby held away from the ratchet wheel 103. Thus as the arm 115 moves downward as in Fig. 12A, the ratchet wheel 105 is turned counterclockwise to the extent of one tooth, and the stop wheel turned in the same direction and to a like extent by action of the pawl 114 upon the pin 109a. Upon subsequent rise of the arm 115 as in Fig. 12B, the end of pawl 113 will enter between the pins 108a, 108b and engage the ratchet wheel 103, the pawl 114 being at the same time withdrawn from the ratchet wheel 105 by the pin 109b. Therefore, on the next down stroke of the arm 115, the ratchet wheel 103 will be picked and turned anticlockwise and the stop wheel 107 turned in unison therewith by the action of the pawl 113 upon the pin 108a. On the next up stroke of the arm 115 the relation of the pawls 113 and 114 will again be as in Fig. 12. In this way, the ratchet wheels 103 and 105 will be continuously picked counterclockwise in alternation as long as the guard disk 120 is positioned as in Fig. 12, with the result that through the spur pinions 95 and 98, the toothed bars 96 and 99 and the selector slides 60 and 60a connected to them will be oppositely shifted respectively to the left and right in alternation as indicated by the arrows in Fig. 12. With the disk positioned as in Fig. 8 and the pawls 116 and 117 released, the ratchet wheels 104 and 106 will be alternately picked clockwise through control of said pawls by the stop wheel 107 as the arm 118 is rocked up and down in the same manner as described above in connection with the pawls 113 and 114, whereby, through the pinions 95 and 98, the toothed bars 96 and 99 and the selector slides 60 and 60a respectively connected to them will be oppositely shifted respectively to the right and left in alternation as indicated by the arrows on them in Fig. 8. The component parts of the indexing unit are so proportioned that, by individual shifts of the selector slides 60 and 60a, single presser elements 31 in the left and right hand groups will be brought into or removed from action.

Drop links 130 and 131 connect the pawl arms 115 and 118 to the horizontal arms of bell crank levers 132 and 133 (Figs. 1, 2 and 3) fixed on a rock shaft 135 which is rotatively supported in suspension bearing brackets 136 and 137 on the center bed 26. The vertical arms of bell crank levers 132 and 133 are coupled, through horizontal links 138 and 139, to the vertical arms of bell crank levers 140 and 141 affixed to another longitudinally-extending rock shaft 142. As shown, shaft 142 is rotatively supported at one end in a rearward extension 143 of the bracket 136 and by other suitable brackets such as the one shown at 145 in Fig. 2 at intervals lengthwise of the machine clamped to a non-rotating rod or shaft 146 of the machine. Also affixed to the shaft 142 is an arm 147 which, through a link rod 148, is connected to an arm 149 free to oscillate on the loop regulating shaft 150 at the front of the machine, and which carries a roller 151 adapted to be acted upon by another rotary cam 152 on cam shaft 29. The roller 151 is shiftable into and out of the path of cam 152 by a fork 153. As shown, fork 153 has a universal pivotal connection intermediate its ends at 155 with the arm 149, and is connected to another horizontal shift rod 156 which extends along the front of the machine and is connected to a bell crank 157, see Fig. 1, arranged to be actuated by a series of cam lugs 158 on the timing chain 79.

The pawl control element 120 of the racking unit 90 is similarly governed from the timing chain 79 through interposed connections including a horizontal link 160 (Figs. 1, 3 and 8) whereby an arm 161 thereon is coupled with a front end of a transversely arranged lever 162 medially fulcrummed at 163 to another fixed bracket 164 on the center bed 26. A link 165 connects the rear end of the lever 162 with one arm of an angular motion-translating lever 166 pivoted at 167, see Fig. 1. The other arm of lever 166 is coupled by a vertical link rod 168 to a finger 169 arranged to be actuated by another series of cam lugs 170 on timing chain 79.

*Operation*

Figure 13:
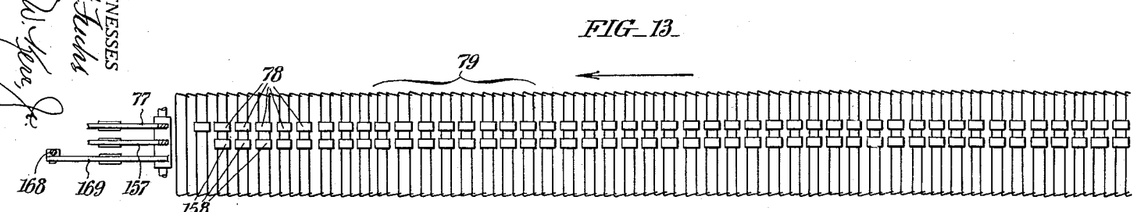
Figs. 13, 13A and 13B, taken together, show the timing chain of the machine in top plan.
Figure 13A:
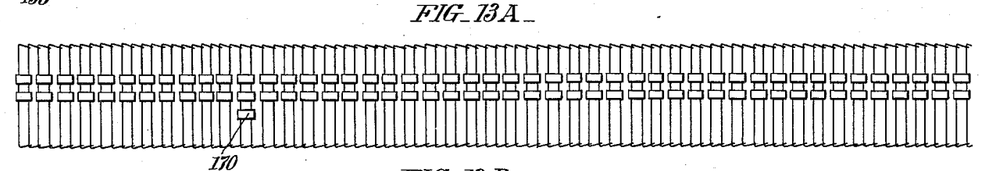
Figure 13B:
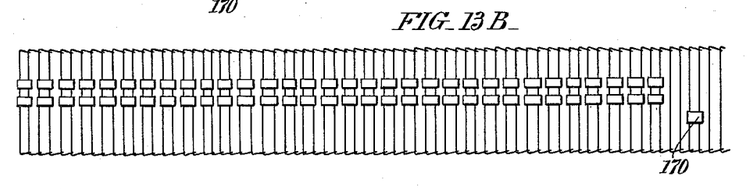

Let it be assumed that the calf and ankle portion of a stocking blank has been completed on the knitting section of the machine shown in Figs. 1 and 5, and that the press movement of needle bar 29 has been modified in preparation for the heel formation as hereinbefore mentioned. With the two groups 30 and 30a of the press elements positioned as in Fig. 5, and with the pawl guard disk 120 of the unit 90 positioned as in Fig. 8, the heel knitting is initiated by starting of the timing chain 79. Upon engagement of the first lug of the series 78 on chain 79 with bell crank lever 77 (Fig. 1), the roller 71 on arm 70 is shifted through rod 76 into the path of rotary cam 72 on cam shaft 79. By this action, the catch plates 63 and 63a are actuated to elevate the selected auxiliary presser elements 31, 31a as in Fig. 4, so that said elements will be in position to be contacted by and to close the beards of the heel needles somewhat later in the same rotation of said shaft during formation of the first heel course. By the next shift of timing chain 79, the first lug of the series 158 will actuate bell crank lever 157 (Fig. 1) and, through rod 156, cause roller 151 on arm 149 to be moved into the path of rotary cam 152 on cam shaft 29 (Fig. 2) whereby, through the interposed connections 148, 147, 142, 141, 133 and 131, arm 118 of racking unit 90 will be operated and ratchet wheel 106 picked one tooth by pawl 117, the companion pawl 116 being at this time held retracted from ratchet wheel 104 by one of the pins 108 on control wheel 107. By this pick of ratchet wheel 106, spur pinion 98 of racking unit 90 is rotatively shifted clockwise, in Fig. 8 with attendant shifting of the toothed bar 99 rightward in Fig. 5 and impartation, through the rod 81 and the block 83, of a corresponding shift to the slide 60, whereby an auxiliary presser element 31 is added to the left hand active set. This shift, it is to be understood, occurs as the heel yarn carriers move rightward. Now it will be observed from Fig. 13, that the second chain lug of the series 78 adjacent the first lug of the series 158 again operates the bell crank lever 77 so that the selected auxiliary presser elements 31, 31a are actuated as before to cause the heel yarns to be knitted by the selected heel needles for the second heel course. Incident to picking of the ratchet wheel 106 of racking unit 90 as just explained, the pawl 117, through engagement of its end with one of the pins 109 on stop wheel 107, will cause said wheel to be shifted in unison with said ratchet 106. Upon completion of this rotative shift, the pin 108 which held pawl 116 is advanced beyond said pawl 113 with the result that the latter will be positioned as in Fig. 8 in readiness to pick ratchet wheel 104 while the pawl 117 is at the same time withdrawn from the ratchet wheel 106 by a succeeding pin 109. Thus, upon passage of the second lug of the series 158 on chain 79 beneath the bell crank lever 157, the ratchet wheel 104 of the racking unit 90 will be picked a tooth by pawl 113, with consequent impartation of a clockwise rotary shift to the spur pinion 95 and through the toothed bar 96 and rod 82 connected to the latter, of a leftward shift to the slide 60a. An auxiliary presser element is thereby added to the right hand group 30a for widening of the right hand heel cheek by two extra needles. The latter shift, it is to be understood, occurs during rightward traverse of the heel yarn carriers. The above action proceeds with addition of two needles in alternation to the two heel knitting groups until the heel cheeks have been widened to the desired extent. At the completion of the widening, the narrowing phase of the heel knitting is initiated by the first lug of the series 170 on timing chain 79 which, in encountering finger 169 (Fig. 1) causes, through the interposed connections 168, 166, 165, 162 and 160, movement of control disk 120 of racking unit 90 to the position in which it is shown in Fig. 12, whereby pawls 116 and 117 are idled and pawls 113 and 114 released for activity.

Figure 8:
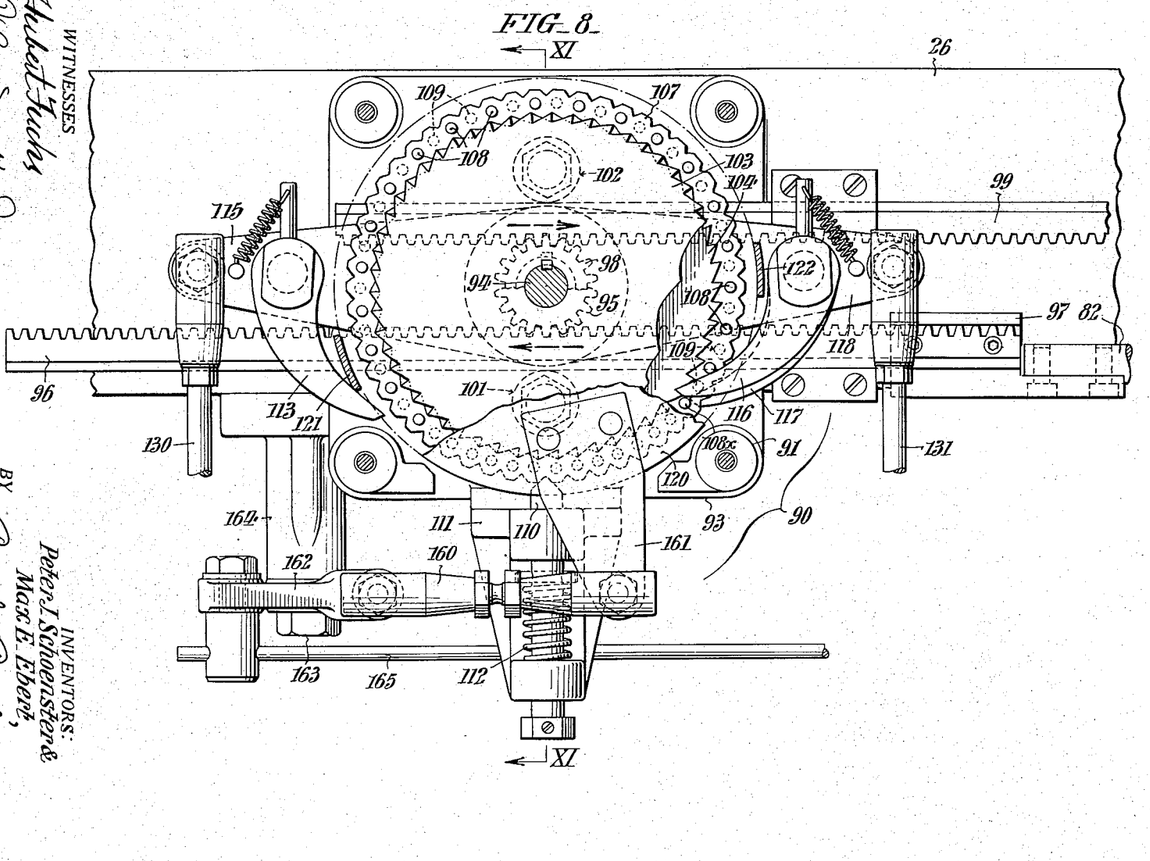
Fig. 8 is a view, in front elevation of an indexing mechanism which we have devised for shifting the selector slides for the auxiliary needle beard presser elements.
Figure 9:
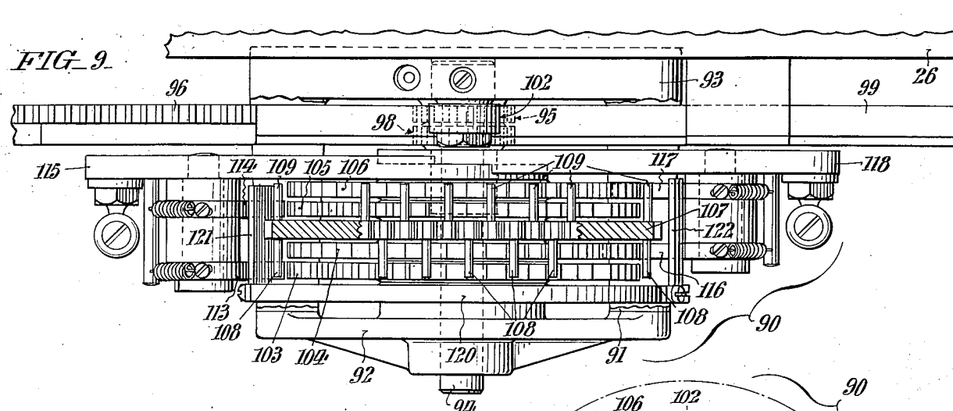
Fig. 9 shows the indexing mechanism of Fig. 8 in top plan.
Figure 10:
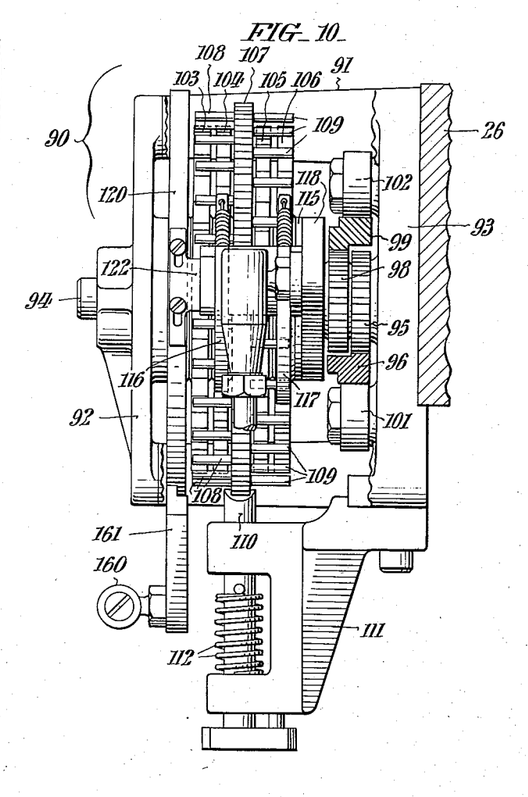
Fig. 10 shows the indexing mechanism as it appears when viewed from the right of Fig. 8.
Figure 11:
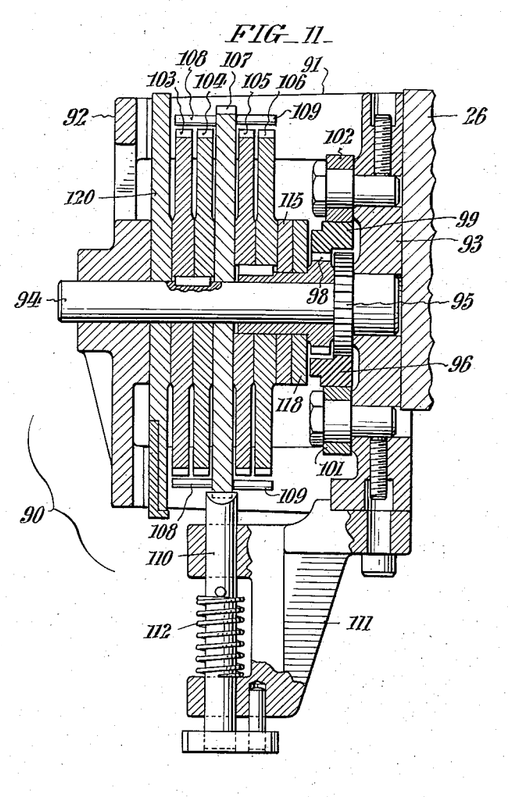
Fig. 11 is a vertical section of the indexing mechanism taken as indicated by the angled arrows XI—XI in Fig. 8.

As a consequence, the ratchet wheels 103 and 105 are thereafter alternately picked under control of wheel 107, and the pinions 95 and 98 of racking unit 90 alternately rotated counterclockwise intermittently to induce progressive outward shifts of the slides 60 and 60a relative to each other in alternate courses of the ensuing knitting. In this way, the number of active auxiliary presser elements of the two sets 30 and 30a is gradually reduced and the heel cheeks therefore correspondingly narrowed progressively, the catch plates 63 and 63a and the pawl carrying arm 118 of racking unit 90 being of course actuated during the narrowing phase as the chain lugs 78 and 158 continue to successively underpass the fingers 77 and 157. Upon completion of the narrowing, the pawl control disk 120 of racking unit 90 is finally restored to the original or normal position in which it is shown in Fig. 8 upon passage of the last lug of the series 170 on chain 79 beyond finger 169.

Having thus described our invention, we claim:

1. In a straight knitting machine, a fixedly-supported sinker head with a forward projection providing a press edge; a bar with spring beard needles adapted to be moved toward and away from the press edge during stitch formation; vertically-arranged auxiliary beard presser elements adapted to coact with individual needles and disposed beneath the forward projection of the sinker head, each such element having a longitudinal slot medially of its height; a fixedly-supported holder in which the presser elements are maintained in definite separation with capacity for independent up and down and pivotal movement; a horizontal pivot rod within the holder passing through the slots of the several auxiliary presser elements; means operative during the knitting to select varying numbers of the presser elements; and actuating means for lifting and at the same time moving the selected elements about the pivot rod so that their upper ends are positioned to the front of the presser edge.

2. A straight knitting machine according to claim 1, wherein the presser elements extend below the holder and have rearwardly projecting heel portions at their bottom ends; wherein the selecting means is in the form of an endwise shiftable slide for engaging the heel portions of the auxiliary presser elements from beneath; and wherein the actuating means is in the form of a vertically reciprocative member with a guide groove for the selector slide, and with a longitudinal flange projection for engaging the heels of said elements from above.

3. In a straight knitting machine, a series of spring beard needles; a plurality of beard presser elements adapted to act upon individual needles; a selector slide shiftable longitudinally of the group of presser elements; and indexing mechanism for shifting the slide to select varying numbers of the presser elements including a toothed bar, a spur pinion in mesh with the teeth of the bar, and selective means for imparting intermittent rotative shifts to the pinion in one direction during certain phases of the knitting and in the other direction during other phases of the knitting.

4. A straight knitting machine according to claim 3, wherein the indexing mechanism is in the form of a pre-assembled unit capable, as such, of application to or removal from the machine.

5. A straight knitting machine according to claim 3, further including a cam shaft from which the knitting instrumentalities derive their movements; and connections motivated from the cam shaft for actuating the selector slide indexing means.

6. A straight knitting machine according to claim 3, further including a cam shaft from which the knitting instrumentalities derive their movements; a timing chain; and connections governed by the timing chain and actuated from the cam shaft for actuating the selector slide indexing mechanism.

7. A straight knitting machine according to claim 3, further including a cam shaft from which the knitting instrumentalities derive their movements; a timing chain; connections governed by the timing chain and actuated from the cam shaft for actuating the selector slide indexing mechanism; and means also governed from the timing chain for actuating the selective means to determine the direction in which the spur pinion is intermittently rotated.

8. In a straight knitting machine, a series of spring beard needles; a group of beard presser elements adapted to act upon individual needles; a selector slide shiftable longitudinally of the group of presser elements; and indexing mechanism for shifting the slide to select varying numbers of the presser elements including a toothed bar, a spur pinion in mesh with the teeth of the bar, a pair of ratchet wheels secured to the spur pinion and respectively having oppositely pitched teeth, individual pawls for picking the respective ratchets, and means for selecting between the pawls to determine intermittent rotations of one of the ratchet wheels during certain phases of the knitting and intermittent rotations of the other ratchet wheel during other phases of the knitting.

9. A straight knitting machine according to claim 8, further including a cam shaft from which the knitting instrumentalities derive their movements; a timing chain; and connections governed from the timing chain for actuation from the cam shaft for actuating the pawls of the indexing mechanism, and other connections also governed by the timing chain for actuating the selective means of the indexing mechanism to determine the direction in which the spur pinions are intermittently rotated.

10. In a straight stocking knitting machine, a press edge, a series of spring beard needles; groups of vertically-arranged pivoted beard presser elements adapted to act upon individual needles of two groups respectively at opposite ends of the series; separate selector slides shiftable longitudinally of the respective groups of presser elements; indexing mechanism for shifting the selector elements contrari-wise including two toothed bars respectively connected to the slides, a pair of spur pinions, one in mesh with and overtraveled by one of the toothed bars, and the other in mesh with and undertraveled by the other toothed bar, and selective means for imparting intermittent rotative shifts to the two pinions in one direction during certain phases of the knitting and in the other direction during another phase of the knitting; and means for raising the slides to lift and at the same time pivot selectively varying numbers of the presser elements so that their upper ends are positioned to the front of the press edge for engagement by the needle beards.

11. A straight knitting machine according to claim 10, further including a cam shaft from which the knitting instrumentalities derive their movements; and connections actuated from the cam shaft for actuating the indexing mechanism.

12. A straight knitting machine according to claim 10, further including a cam shaft from which the knitting instrumentalities derive their movements; a timing chain; and connections governed from the timing chain for actuation from the cam shaft for to operate the indexing mechanism.

13. In a straight knitting machine, a press edge, a series of spring beard needles; groups of vertically-arranged pivoted beard presser elements adapted to act individually upon needles of two groups respectively at opposite ends of the series; separate selector slides shiftable longitudinally of the respective groups of presser elements; a pair of parallel toothed bars respectively connected to the slides; a spur pinion in mesh with and overtraveled by one of the toothed bars; an independently-rotatable coaxially-mounted spur pinion in mesh with and undertraveled by the other toothed bar; pairs of ratchet wheels secured to the pinions, the respective wheels of each such pair having oppositely pitched teeth; a set of pawls for picking the similarly-pitched ratchet wheels of the respective pairs; another set of pawls for picking the other similarly-pitched ratchet wheels of the respective pairs; a guard element for holding one set of the pawls retracted with the other set released for operation; control means for determining alternate operation of the active pawls on the ratchet wheels with which they are respectively associated whereby, through the spur pinions and the toothed bars, the selector slides are shifted contrari-wise in alternation during certain phases of the knitting; means for changing the position of the guard element to render the set of previously active pawls idle and at the same time release the previously retracted set to operate alternately upon the other pair of similarly pitched ratchet wheels under governance of said control means for concurrent contrari-wise shifting of the selector slides likewise progressively and in alternation as before but in the opposite directions during other phases of the knitting; and means for raising the slides to lift and at the same time pivot selectively varying numbers of the presser elements so that their upper ends are positioned to the front of the presser edge for engagement by the needle beards.

14. A straight knitting machine according to claim 13 wherein the pawl control means is in the form of a disk supported for independent rotation coaxially between the two pairs of ratchet wheels and having circumferentially-arranged pins of a number corresponding to the teeth of the ratchet wheels, with alternate pins extending laterally over one pair of the wheels and the intermediate pins extending laterally over the other pair of wheels, said pins being so disposed that the end of one of the active pawls is permitted to enter between a pair of pins at one side of the disk to engage its ratchet wheel and at the same time cause the disk to be moved with such ratchet wheel, while the other of the active pawls is temporarily held withdrawn from its ratchet wheel by a pin at the other side of the disk and vice versa.

15. A straight knitting machine according to claim 13. further including a cam shaft from which the knitting instrumentalities derive their movements; a timing chain; connections governed from the timing chain and actuated from the cam shaft for actuating the pawls; and other connections likewise governed from the timing chain and actuated from the cam shaft for moving the guard element.

16. A straight knitting machine according to claim 13, wherein the toothed bars, the spur pinions, the ratchet wheels, the pawls and the pawl control means are preassembled into the form of an indexing unit capable, as such, of application to or removal from the machine.

PETER J. SCHOENSTER.
MAX EMIL EBERT.

REFERENCES CITED

The following references are of record in the file of this patent:

UNITED STATES PATENTS

| Number | Name | Date |
|---|---|---|
| 2,430,882 | Ludwig | Nov. 18, 1947 |

FOREIGN PATENTS

| Number | Country | Date |
|---|---|---|
| 8,899 | Great Britain | of 1893 |